United States Patent Office 2,962,346
Patented Nov. 29, 1960

2,962,346

PROCESS FOR PREPARING ALKALI METAL ZIRCONATE FROM ZIRCON

Charles J. Sindlinger and Carl C. Clayton, Jr., Corpus Christi, Tex., assignors to Columbia-Southern Chemical Corporation, Allegheny County, Pa., a corporation of Delaware No Drawing. Filed June 18, 1957, Ser. No. 666,477

12 Claims. (Cl. 23—16)

This invention relates to an improvement in the method of recovering zirconium from zircon sand. Zircon sand is one of the more common ores from which zirconium may be recovered. It is predominantly a compound of zirconium and silicon, which compound has the approximate composition $ZrO_2SiO_2$. The silica is chemically bound with the zirconium.

In the recovery of zirconium from such an ore, it is necessary to treat the ore in order to break the chemical bond between the silica and the $ZrO_2$. It has been recognized that this may be effected by heating together a mixture of zircon sand and an alkali metal hydroxide, such as sodium hydroxide. When reaction temperature is reached, a very rapid reaction takes place producing a reaction product or "frit" which comprises alkali metal zirconium compounds and silicon compounds. The result is to convert the silica component to a water soluble form, probably as sodium silicate, so that upon water extraction, the silica can largely be removed, leaving a product comprising the $ZrO_2$ in the form of an alkali metal zirconate as an undissolved residue. This $ZrO_2$ may then be extracted with various acids, such as hydrochloric acid or nitric acid, in order to solubilize the $ZrO_2$ component. The term "alkali metal zirconate frit" or "sodium zirconate frit," as used hereinafter, refers to the reaction product of the alkali metal hydroxide (sodium hydroxide) with zircon, and includes both water soluble silica compounds as well as the water insoluble components. The term "alkali metal zirconate" or "sodium zirconate" includes the above-described frit as well as the solid product remaining after extraction of frit with water.

In the practice of this process, there are several difficulties encountered. In the first place, the mixture is quite corrosive and consequently serious corrosion of equipment takes place. This may even be so severe as to result in an undue contamination of the product with the materials of construction. Furthermore, in the course of the operation, serious caking of the mixture can take place. This frequently makes difficult the performance of the operation in a continuous manner.

According to this invention, it has been found that the reaction described above can be more effectively performed by conducting it in the presence of a preformed alkali metal zirconate or alkali metal zirconate frit such as sodium zirconate frit. The amount of said frit should be sufficient to minimize the tendency of the reaction mixture to agglomerate unduly or to become liquid or to minimize segregation of molten alkali metal hydroxide from the mixture. Usually, the process is conducted with an initial amount of at least 20 percent by weight of the alkali metal zirconate, based upon the weight of alkali metal hydroxide, zircon, and alkali metal zirconate in the reaction mixture, usually at least 0.3 part by weight, preferably 1 to 5 or more parts (rarely in excess of 15 parts) by weight of alkali metal zirconate or frit per part by weight of the zircon in the mixture.

The process may be conducted in various ways. In the practice of one embodiment, a body of frit, with or without zircon, is established at a temperature at which alkali metal hydroxide will react with zircon (at least 450 to 500° C.) and alkali metal hydroxide and zircon, if necessary, is added thereto either in molten or flake, powder or other pulverulent state. For example, a mixture of zircon and alkali metal zirconate may be heated above about 450 to 500° C., preferably 500 to 600° C., and the alkali metal hydroxide added to the hot mixture.

In the practice of an especially valuable embodiment, a fluidized bed of the particles of frit may be suspended in an upwardly flowing stream of gas which is inert to alkali metal hydroxide (air, nitrogen or the like), the bed is maintained above about 450 to 500° C., and zircon and alkali metal hydroxide are added thereto periodically or continuously. In such a case, the amount of frit present is maintained above 30 percent, preferably at least 75 to 95 percent, by weight of the frit, zircon, and alkali metal hydroxide in the bed. Frit is withdrawn continuously or periodically.

Alternatively, preformed frit may be mixed with aqueous or anhydrous alkali metal hydroxide and zircon, and the mixture heated in a rotary calciner or similar device in which the mixture may be tumbled or otherwise well mixed.

Thus, the process may be conducted in a continuous manner by feeding a mixture of alkali metal hydroxide, zircon and frit into the preheat section of a rotary kiln where it is heated to 500° C. and the mixture thus caused to react, as it passes through the remainder of the kiln. Moreover, zircon or a mixture of zircon and alkali metal zirconate may be introduced into the inlet end of the kiln and alkali metal hydroxide added to the frit-zircon mixture while the mixture is at reaction temperature at several places located longitudinally along the kiln and in the direction of flow toward the exit end thereof. As a consequence, frit is formed at the point where the initial introduction of alkali metal hydroxide is produced and, as the mixture tumbles, it is delivered to a point further down the kiln where further alkali is added and thus gradually increases in frit concentration as the alkali metal hydroxide is added thereto at reaction temperature. This method of introduction of alkali metal hydroxide thus produces a mixture of frit and zircon, and the frit thus formed serves to prevent the mixture from becoming liquid upon subsequent addition of further alkali.

The rate of addition of alkali metal hydroxide in any case is held low enough so that the reaction mixture remains solid and does not convert to a slurry or melt.

The practice of the process of the present invention offers a number of advantages. In the first place, danger of corrosion during the preheat period is substantially minimized since the product contains enough frit to prevent the mixture from becoming liquid and to minimize segregation of alkali metal hydroxide from the mixture. Segregation of the sodium hydroxide can tend to cause incomplete reaction as well as corrosion. Moreover, the formation of a liquid phase during the course of the heating tends to cause the reaction mixture to cake and/or agglomerate severely, thus making handling more difficult. By proceeding according to the present invention, these difficulties are less severe and usually are no longer significant.

The amount of alkali metal hydroxide that is used should be enough to react with a substantial amount of the zirconium ore but should not be so large as to cause production of a liquid reaction mixture. That is, the mixture should remain in either an essentially pulverulent mixture or at least as a plastic or semi-plastic mass in which the reaction mixture as a whole does not have the properties of a liquid. Where a substantial amount of frit is present, the amount of alkali metal hydroxide may be in substantially stoichiometric amounts. In the case of sodium hydroxide, it may range from about 0.6 to 2 (rarely over 1.5) pounds per pound of zircon. However, substantially less sodium hydroxide than the stoichiometric amount, for example, 0.1 to 0.6 pound per pound of zircon ore may be used. In such a case, the unreacted zircon may be subsequently separated and recycled. Equivalent amounts of potassium hydroxide or like alkali metal hydroxide may be used in lieu of sodium hydroxide.

The alkali metal hydroxide used in the processes herein contemplated may be aqueous or anhydrous. Usually it contains less than about 50 percent by weight of water. More dilute alkali metal hydroxide may be used. However, excessive dilution is undesirable since the reaction occurs at temperatures at which the mixture is essentially anhydrous and in solid state. Addition of undue amounts of water simply requires that the water be evaporated in order to achieve reaction.

The zircon ore which is subjected to treatment normally is relatively finely divided, usually having a particle size below about 50 mesh.

The following examples are illustrative:

*Example I*

Two hundred fifty grams of zircon sand containing 66.9 percent by weight of $ZrO_2$ and 32.3 percent by weight of $SiO_2$, and having a particle size below 50 mesh, was placed in a nickel crucible 6 inches high and 3 inches in diameter, forming a bed 0.75 inch deep. The crucible was heated in an electric furnace and the bed was agitated by an impeller. The sand was heated to about 600 to 650° C. Thereafter, 250 grams of molten sodium hydroxide heated to about 500° C. was added to the mixture in small increments, care being taken to avoid addition of an amount which converted the reaction mixture to a moist state. Thus the initial addition of alkali generated frit which aided in the subsequent stages of reaction resulting from later increments of the caustic. Throughout the entire period of reaction, the reaction mixture remained pulverulent and dry in appearance. Reaction occurred in each case immediately after addition of each increment of sodium hydroxide. After addition of each increment, a portion of the mixture was cooled, leached with water and then with hydrochloric acid. The results were as follows:

| Grams of NaOH added per gram of Zircon Sand | Percent of Zirconium in Zircon rendered acid soluble |
|---|---|
| 0.2 | 18 |
| 0.5 | 37 |
| 0.8 | 62 |
| 1.0 | 79 |

In the course of addition of the entire 250 grams of sodium hydroxide, the mixture became slightly moist but remained in essentially solid state as distinguished from a liquid mass.

*Example II*

Two hundred fifty grams of zircon sand having the composition mentioned in Example I, 250 grams of powdered anhydrous sodium hydroxide, and 750 grams of sodium zirconate frit produced as in Example I are thoroughly intermixed and the mixture gradually heated in a nickel crucible while stirring the mixture as in Example I. When the mixture reaches a temperature of about 500 to 550° C., a rapid reaction takes place forming sodium zirconate frit. Little or no caking or segregation of sodium hydroxide takes place.

*Example III*

A mixture of one part by weight of zircon sand, 1.1 parts by weight of sodium hydroxide powder, and three parts by weight of sodium zirconate frit is prepared and fed at the rate of about 50 pounds of mixture per hour into one end of a rotary kiln 7 inches in diameter and 8 feet long. The kiln is a metal tube, for example, of inconel, and is inclined toward the exit end. It is heated externally by gas burners to establish a temperature in the mixture of 500–550° C. The kiln is rotated rapidly enough to prevent localized overheating of the mixture.

*Example IV*

In this embodiment, the reactor is an upright metal tube 24 inches in diameter and tapered inwardly at the bottom. The tube is provided with an external shell in which are disposed gas burners for heating the tube and its contents.

The tube is filled to a depth of about 3 feet with sodium zirconate frit having a particle size of 50 to 100 mesh. Nitrogen is introduced into the tube through the bottom of the tapered section at a rate sufficient to cause the bed of granules to be suspended or "fluidized" in the nitrogen stream, and the bed is heated to a temperature of about 500–575° C. Gas velocity in the bed is in the range of 0.5 foot per second.

After the temperature of the bed has reached 550° C., a mixture of equal parts by weight of zircon ore and sodium hydroxide is added continuously at a rate of 50 pounds of the mixture per hour. Product is withdrawn in increments at 15-minute intervals. The process can be conducted for long periods of time without interruption. The sodium zirconate frit content of the bed remains above about 75 percent by weight throughout the operation.

In the processes described above, other alkali metal hydroxides, such as potassium hydroxide or lithium hydroxide, may be used in equivalent amounts in lieu of a part or all of the sodium hydroxide in any of the above examples or embodiments.

Although the present invention has been described with reference to the specific details of certain embodiments, it is not intended that such details shall be regarded as limitations upon the scope of the invention except insofar as included in the accompanying claims.

What is claimed:

1. In the method of reacting zircon with alkali metal hydroxide whereby to produce an alkali metal zirconate, the improvement which comprises conducting the reaction of alkali metal hydroxide with zircon in a reaction mixture thereof containing at least about 0.3 part by weight of preformed alkali metal zirconate per part by weight of zircon at a temperature high enough to cause the alkali metal hydroxide to react with zircon but below that at which the mixture becomes liquid.

2. The method of claim 1 wherein the reaction mixture contains about 1 to 5 parts by weight of preformed alkali metal zirconate per part by weight of zircon.

3. The method of claim 1 wherein the reaction mixture contains about 1 to 15 parts by weight of preformed alkali metal zirconate per part by weight of zircon.

4. The process of claim 1 wherein the alkali metal is sodium.

5. The process of claim 1 wherein the reaction is conducted by adding alkali metal hydroxide to a mixture of the zirconate and the zircon which is at said temperature.

6. A method of preparing an alkali metal zirconate which comprises heating a bed of particles of alkali metal zirconate suspended in an upwardly rising stream of a gas which is inert to alkali metal hydroxide and alkali metal zirconate, maintaining the temperature of said bed above 450° C. but below the temperature at which said bed becomes liquid, adding thereto alkali metal hydroxide and zircon in pulverulent form whereby to form alkali metal zirconate, and maintaining the alkali metal zirconate content of said bed at least about 30 percent of the alkali metal hydroxide, zircon, and alkali metal zirconate therein.

7. The method of claim 6 wherein the alkali metal zirconate content of said bed is at least about 50 percent of the alkali metal hydroxide, zircon and alkali metal zirconate therein.

8. The method of claim 6 wherein the alkali metal zirconate content of said bed is maintained between 75 and 95 percent of the alkali metal hydroxide, zircon, and alkali metal zirconate therein.

9. A method of preparing an alkali metal zirconate which comprises heating a bed of particles of alkali metal zirconate at a temperature of at least 450 to 500° C. but below the temperature at which said bed becomes liquid, adding alkali metal hydroxide and zircon to said bed whereby said hydroxide and zircon are caused to react together, and maintaining the amount of alkali metal zirconate in said bed at least 20 percent by weight of the alkali metal hydroxide, alkali metal zirconate, and the zircon in said bed.

10. The process of claim 9 wherein the alkali metal is sodium.

11. A method of preparing an alkali metal zirconate which comprises heating a mixture of alkali metal zirconate, zircon, and alkali metal hydroxide containing at least 20 percent by weight of alkali metal zirconate to a temperature of at least 450 to 500° C. but below the temperature at which said mixture becomes liquid whereby to cause the alkali metal hydroxide to react with the zircon and to form additional alkali metal zirconate.

12. The process of claim 11 wherein the alkali metal zirconate is 20 to 95 percent by weight of the mixture.

References Cited in the file of this patent

UNITED STATES PATENTS

| | | |
|---|---|---|
| 1,527,470 | Cooper | Feb. 24, 1925 |
| 1,658,807 | Kinzie | Feb. 14, 1928 |
| 2,063,811 | Jaeger | Dec. 8, 1936 |
| 2,696,425 | Kistler | Dec. 7, 1954 |

FOREIGN PATENTS

| | | |
|---|---|---|
| 271,873 | Great Britain | Sept. 24, 1928 |
| 717,930 | Great Britain | Nov. 3, 1954 |

OTHER REFERENCES

Browning: "Introduction to the Rarer Elements," publ. by J. Wiley and Sons, New York, 1914, pages 76 and 77.

Mellor: "Comprehensive Treatise on Inorganic and Theoretical Chemistry," publ. by Longmans, Green and Co., New York, vol. 7, 1927, pages 101 to 103, 134 and 135.

Beyer et al.: U.S. Atomic Energy Comm. publication ISC–437 (Rev.).